(12) United States Patent
Gonguet et al.

(10) Patent No.: US 7,443,889 B2
(45) Date of Patent: Oct. 28, 2008

(54) NETWORK OR SERVICE MANAGEMENT SYSTEM FOR DETERMINING THE SYNCHRONIZATION BETWEEN TWO STREAMS OF PACKETS

(75) Inventors: Arnaud Gonguet, Paris (FR); Olivier Poupel, Tinteniac (FR); Gérard Delegue, Cachan (FR); Olivier Martinot, Draveil (FR)

(73) Assignee: Alcatel, Paris (FR)

( * ) Notice: Subject to any disclaimer, the term of this patent is extended or adjusted under 35 U.S.C. 154(b) by 991 days.

(21) Appl. No.: 10/345,219

(22) Filed: Jan. 16, 2003

(65) Prior Publication Data

US 2003/0133416 A1  Jul. 17, 2003

(30) Foreign Application Priority Data

Jan. 17, 2002 (FR) .................................. 02 00550

(51) Int. Cl.
*H04J 3/06* (2006.01)
(52) U.S. Cl. ................... 370/516; 370/509; 370/517
(58) Field of Classification Search .......... 370/507–521
See application file for complete search history.

(56) References Cited

U.S. PATENT DOCUMENTS

| | | | | |
|---|---|---|---|---|
| 5,537,409 A * | 7/1996 | Moriyama et al. | ........... | 370/471 |
| 5,623,483 A * | 4/1997 | Agrawal et al. | ............. | 370/253 |
| 5,901,149 A * | 5/1999 | Itakura et al. | ................ | 370/468 |
| 6,173,317 B1 * | 1/2001 | Chaddha et al. | ............. | 709/219 |
| 6,493,872 B1 * | 12/2002 | Rangan et al. | ................. | 725/32 |
| 6,510,553 B1 * | 1/2003 | Hazra | ........................... | 725/87 |
| 6,654,956 B1 * | 11/2003 | Trinh et al. | ................. | 725/100 |
| 6,738,427 B2 * | 5/2004 | Zetts | ...................... | 375/240.28 |
| 7,006,976 B2 * | 2/2006 | Glatt | .......................... | 704/500 |
| 7,030,930 B2 * | 4/2006 | Kovacevic | ................... | 348/515 |
| 7,042,840 B2 * | 5/2006 | Howald et al. | ............... | 370/229 |
| 7,043,684 B2 * | 5/2006 | Joly | ........................... | 714/814 |
| 7,093,275 B2 * | 8/2006 | Birks et al. | ................... | 725/105 |
| 7,143,177 B1 * | 11/2006 | Johnson et al. | ............. | 709/231 |
| 7,190,697 B2 * | 3/2007 | Van Den Heuvel et al. | . | 370/394 |

FOREIGN PATENT DOCUMENTS

| WO | WO 99/22477 A | 5/1999 |
|---|---|---|
| WO | WO 99/44363 A1 | 9/1999 |

OTHER PUBLICATIONS

Jacobs S et al.: "Real-Time Video on the Web Using Dynamic Rate Shaping" Image Processing, 1997. Proceedings., International Conference on Santa Barbara, CA, USA Oct. 26-29, 1997, Los Alamitos, CA, USA, IEEE Comput. Soc., US, Oct. 26, 1997, pp. 14-17, XP010253687.

(Continued)

*Primary Examiner*—Wing F. Chan
*Assistant Examiner*—Mark A. Mais
(74) *Attorney, Agent, or Firm*—Sughrue Mion, PLLC

(57) ABSTRACT

A network management system for determining the synchronization between two streams of packets transmitted in a transport network measures throughput variations for each of the streams of packets and determines the synchronization by comparing the variations.

12 Claims, 1 Drawing Sheet

OTHER PUBLICATIONS

Xie Y et al: "Adaptive Multimedia Synchronization in a Teleconference System" 1996 IEEE International Conference on Communications (ICC). Converging Technologies for Tomorrow's Applications, Dallas, Jun. 23-27, 1996, IEEE International Conference on Communications (ICC), New York, IEEE, US vol. 3, Jun. 23, 1996, pp. 1355-1359, XP000625031.

Montgomery W A: "Techniques for Packet Voice Synchronization" IEEE Journal on Selected Areas in Communications, IEEE Inc. New York, US, vol. SAC-1, No. 6, Dec. 1, 1983, pp. 1022-1028, XP000563228.

\* cited by examiner

FIG_1
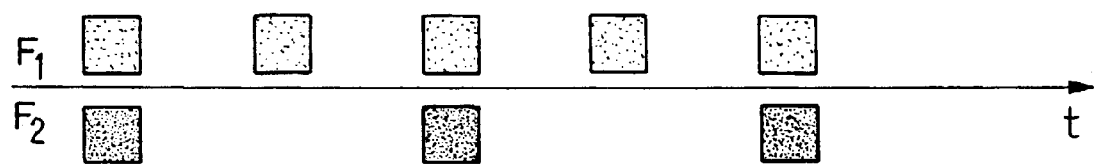
FIG_2
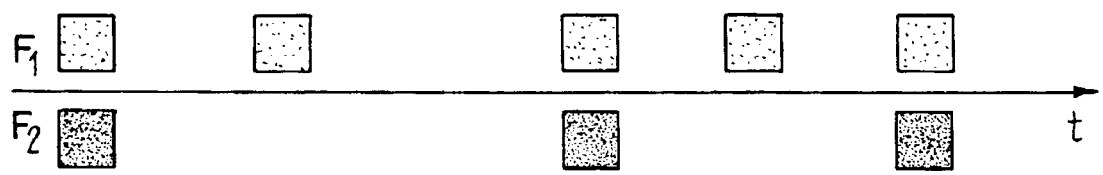
FIG_3
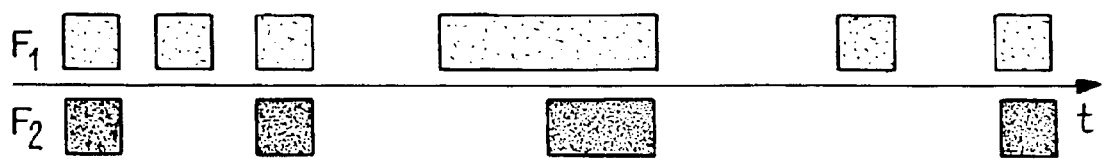

NETWORK OR SERVICE MANAGEMENT SYSTEM FOR DETERMINING THE SYNCHRONIZATION BETWEEN TWO STREAMS OF PACKETS

CROSS-REFERENCE TO RELATED APPLICATIONS

This application is based on French Patent Application No. 02 00 550 filed Jan. 17, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to the management of services provided in a transport network, in particular a telecommunication network.

2. Description of the Prior Art

The same telecommunication service can use more than one stream of data. This is known in the art. For example, a video on demand (VoD) service comprises a video only data stream and an audio data stream. Each of the data streams is transported in accordance with specific protocols and can be managed differently by some transport network elements.

It is nevertheless clear that in some cases the service may require synchronization between the data streams providing it.

In some cases the synchronization problem can be overcome relatively easily. Synchronizing the packets of a data stream leads to an offset in the reception of the packets, which can be corrected by means of a buffer system.

On the other hand, desynchronization between the data streams (packet throughput) leads to drift, i.e. an increase in the desynchronization between packets, making this impossible for prior art solutions to correct.

In the example of video on demand, it is therefore necessary for the audio data stream and the video data stream to be sufficiently synchronized to provide a good quality of service on reception.

The service management system must therefore be able to determine if two data streams are synchronized or not. It must therefore have access to a method of measuring this.

SUMMARY OF THE INVENTION

To this end, the invention provides a network management system for determining the synchronization between two streams of packets transmitted in a transport network, the system including means for measuring throughput variations for each of the streams of packets and for determining the synchronization by comparing the variations.

In one embodiment of the invention the throughput variations are calculated for each stream of packets as the variations of the ratio between the total size of the packets and the total time intervals between two successive packets of the stream of packets, considered over a time window.

In one embodiment of the invention two streams of packets are deemed to be synchronized if the difference between their respective throughputs is below a tolerance threshold.

The invention also provides a service management system including the above network management system.

In one embodiment of the invention the streams of packets are associated with the same service.

Additionally, one or more parameters relating to the synchronization measurement can be inserted in a service level specification associated with the service.

Accordingly, the network management system can measure the degree of synchronization between two data streams at any time.

An advantage of the invention is that the service management system does not need to know the expected ratio between the data streams.

The invention and its advantages will become more clearly apparent in the course of the following description with reference to the accompanying drawings of embodiments of the invention.

BRIEF DESCRIPTION OF THE DRAWINGS

FIGS. 1, 2 and 3 each show a timing diagram for the transmission of two streams of packets.

DETAILED DESCRIPTION OF THE PREFERRED EMBODIMENTS

The synchronization measurement method of the invention applies particularly well to service management systems, especially if the two streams of packets whose synchronization is to be measured belong to the same service. Nevertheless, the invention can be applied to measuring the synchronization of any two streams of packets.

Associating with a service a service level agreement (SLA) yielding a service level specification (SLS) is known in the art.

In one embodiment of the invention, one or more parameters relating to the synchronization of two or more data streams can be inserted into the SLS.

The parameters can consist simply of an indicator indicating that the two streams of packets must be synchronized. They can also consist in a tolerance threshold, specifying what degree of freedom can be left to synchronization. In the embodiment of the invention that has been reduced to practice, the tolerance threshold is called the synchronization deviation tolerance (SDT).

The network management system has means for measuring the throughput variations for each of the streams of packets.

In one embodiment of the invention, the throughput variations for each stream of packets are calculated as variations in the ratio between the total size of the packets and the total time intervals between two successive packets of the same stream of packets, considered over a time window.

FIGS. 1 to 3 show different situations in which two synchronized streams of packets evolve. Each figure shows timing diagrams for the transmission of two streams of packets $F_1$, $F_2$. The abscissa axis represents time t. In the three timing diagrams, the packets are represented by shaded rectangles. The length of the rectangles along the time axis represents the size of the packet directly. Similarly, the time interval between packets is directly related to the gap between the corresponding rectangles.

In FIG. 1, the time interval between two successive packets of the streams of packets is constant, and likewise their size.

In FIG. 2, the size of the packets remains constant, but the time interval between two successive packets varies.

In FIG. 3, both the size of the packets and the time interval between successive packets vary.

The network management system measures, over a given time window $\Delta t$:

the respective packet sizes $p_{1,i}$, $P_{2,i}$ for both streams of packets, and the time interval $d_{1,i}$ and $d_{2,i}$ between two successive packets in each stream of packets.

The suffix i indicates the rank of the packet in the time window $\Delta t$ and the first suffix (1 or 2) specifies the stream of packets.

The network management system can then determine the synchronization of the streams of packets by comparing the throughput variations of those streams. Thus the expected ratio between the throughputs can be ignored. For example, two streams are deemed to remain synchronized if the throughput variation of one stream does not exceed 5% of the throughput variation of the other stream, regardless of the actual value of the throughputs. The throughputs are calculated as being the ratios between the total size of the packets and the total time intervals between successive packets of the same stream, considered over a time window, for each data stream.

In other words, this amounts to calculating the variation for the first stream of packets using the following equation:

$$\Delta\left(\frac{\sum_{\Delta t} p_{1,i}}{\sum_{\Delta t} d_{1,i}}\right)$$

and then calculating the variation for the second stream of packets from the following equation:

$$\Delta\left(\frac{\sum_{\Delta t} p_{2,i}}{\sum_{\Delta t} d_{2,i}}\right)$$

In the above expressions, the symbol $\Delta$ expresses the calculation of a variation with respect to time. Summation for all the packets in the time window $\Delta t$ is indicated by the expression $$\sum_{\Delta t}.$$

In one particular embodiment, to facilitate the comparison of the variations, the network management system can calculate the following expression:

$$\left|\Delta\left(\frac{\sum_{\Delta t} p_{1,i}}{\sum_{\Delta t} d_{1,i}}\right) - \Delta\left(\frac{\sum_{\Delta t} p_{2,i}}{\sum_{\Delta t} d_{2,i}}\right)\right|$$

The value obtained in this way can then be compared to a synchronization deviation tolerance (SDT), as previously mentioned. If the following condition applies:

$$\left|\Delta\left(\frac{\sum_{\Delta t} p_{1,i}}{\sum_{\Delta t} d_{1,i}}\right) - \Delta\left(\frac{\sum_{\Delta t} p_{2,i}}{\sum_{\Delta t} d_{2,i}}\right)\right| \leq SDT$$

the network management system deems the two streams of packets to be synchronized. Conversely, as soon as the above condition is no longer satisfied, it deems the two streams of packets to be no longer synchronized.

It can then instigate predefined actions, in particular alert the operator so that the latter can respond.

In one embodiment of the invention, a parameter can be inserted into the SLS defining the time window over which the measurements must be carried out. This can be a period, for example.

What is claimed is:

1. A network management system for determining the synchronization between two streams of packets transmitted in a transport network, said system including:
    means for measuring throughput variations for each of said two streams of packets; and
    means for determining the synchronization by comparing said throughput variations, wherein said throughput variations for each of said two streams of packets comprise variations of the ratio between the total size of the packets and the total time intervals between two successive packets of said stream of packets, and further wherein said variations of the ratio are calculated over a time window, and a time interval between said two successive packets of said stream of packets is variable.

2. The network management system claimed in claim 1, wherein said two streams of packets are synchronized if a difference between their respective throughputs is below a tolerance threshold.

3. A service management system including a network management system as claimed in claim 1.

4. The service management system claimed in claim 3 wherein said two streams of packets are associated with a service.

5. The service management system claimed in claim 4 wherein at least one parameter relating to said synchronization measurement is inserted in a service level specification associated with said service.

6. The network management system of claim 5, wherein said parameter comprises an indicator of a difference between said variations of said ratio to a synchronization deviation tolerance, which specifies a degree of freedom that can be left to synchronization.

7. A method of determining the synchronization between two streams of packets transmitted in a transport network a network management system, said method including:
    measuring throughput variations for each of said two streams of packets; and
    determining the synchronization by comparing said throughput variations, wherein said throughput variations for each of said two streams of packets comprise variations of the ratio between the total size of the packets and the total time intervals between two successive packets of said stream of packets, and further wherein said variations of the ratio are calculated over a time window, and a time interval between said two successive packets of said stream of packets is variable.

8. The method of claim 7, wherein said two streams of packets are synchronized if a difference between their respective throughputs is below a tolerance threshold.

9. A service management system including a method as claimed in claim 7.

10. The method of claim 9, wherein said two streams of packets are associated with a service.

11. The method of claim 10, wherein at least one parameter relating to said synchronization measurement is inserted in a service level specification associated with said service.

12. The method of claim 11, wherein said parameter comprises an indicator of a difference between said variations of said ratio to a synchronization deviation tolerance, which specifies a degree of freedom that can be left to synchronization.

* * * * *